(12) United States Patent
Thakolsri et al.

(10) Patent No.: US 8,743,719 B2
(45) Date of Patent: Jun. 3, 2014

(54) METHOD AND APPARATUS FOR ALLOCATING NETWORK RATES

(75) Inventors: Srisakul Thakolsri, Munich (DE); Wolfgang Kellerer, Fuerstenfeldbruck (DE); Eckehard Steinbach, Olching (DE)

(73) Assignee: NTT DoCoMo, Inc., Tokyo (JP)

( * ) Notice: Subject to any disclaimer, the term of this patent is extended or adjusted under 35 U.S.C. 154(b) by 219 days.

(21) Appl. No.: 13/199,408

(22) Filed: Aug. 29, 2011

(65) Prior Publication Data

US 2012/0051299 A1 Mar. 1, 2012

(30) Foreign Application Priority Data

Aug. 30, 2010 (EP) .................................... 10174500

(51) Int. Cl.
*H04W 4/00* (2009.01)
*H04W 72/00* (2009.01)
*H04B 7/00* (2006.01)

(52) U.S. Cl.
USPC ........ 370/252; 370/329; 370/332; 455/452.2; 455/509

(58) Field of Classification Search
USPC ......... 370/229–240, 253, 329, 330, 332, 344, 370/412, 432, 444, 468, 252; 455/436, 52, 455/452.1, 452.2, 453, 509
See application file for complete search history.

(56) References Cited

U.S. PATENT DOCUMENTS

| | | | |
|---|---|---|---|
| 6,751,472 B1* | 6/2004 | Muhonen .................... | 455/553.1 |
| 2003/0064730 A1* | 4/2003 | Chen et al. .................... | 455/453 |
| 2003/0095187 A1* | 5/2003 | Ferguson ...................... | 348/180 |
| 2004/0136379 A1* | 7/2004 | Liao et al. ................ | 370/395.21 |
| 2007/0180134 A1* | 8/2007 | Steinbach et al. ............ | 709/230 |
| 2009/0003266 A1* | 1/2009 | Stolyar et al. ................. | 370/328 |

FOREIGN PATENT DOCUMENTS

| | | |
|---|---|---|
| EP | 1798897 A1 | 6/2007 |
| EP | 1962456 A1 | 8/2008 |

OTHER PUBLICATIONS

International Telecommunications Union (ITU-T), "Series P: Telephone Transmission Quality—Methods for objective and subjective assessment of quality," © 1996, ITU, 37 pages.
Khan, Shoaib et al., "MOS-Based Multiuser Multiapplication Cross-Layer Optimization for Mobile Multimedia Communicator," Hindawi Publishing Company, Advances in Multimedia, vol. 2007, Article ID 94918, 11 pages.

(Continued)

*Primary Examiner* — Alpus H Hsu
*Assistant Examiner* — Dharmesh Patel
(74) *Attorney, Agent, or Firm* — Brinks Gilson & Lione (57) ABSTRACT

There is provided a method for allocating network rates to a plurality of mobile terminals through which users access possibly different applications through a network having a certain limited total bandwidth to allocate. The method comprises an optimization operation which uses a quality utility function as input which indicates for a certain application the quality perceived by a user depending on the allocated data rate, preferably further also depending on the channel condition. Then there is performed an optimizing operation such that it calculates a combined quality measure based on the quality utility functions for the different applications and for different possible resource allocations to the plurality of applications in such a way that said quality measure is optimized.

12 Claims, 4 Drawing Sheets
(3 of 4 Drawing Sheet(s) Filed in Color)

(56) References Cited

OTHER PUBLICATIONS

Ramos, Naomi et al., "A Device Network-Aware Scaling Framework for Efficient Delivery of Scalable Video Over Wireless Networks," 18th Annual IEEE International Symposium on Personal, Indoor and Mobile Radio Communications, © 2007, IEEE, 5 pages.

Extended European Search Report for European Application No. 10174500.8, dated Mar. 14, 2011, 12 pages.

\* cited by examiner

VS1 → Foreman
VS2 → MthrDotr
VS3 → Football
VS4 → Soccer
VS5 → Football2

Fig. 3 B

METHOD AND APPARATUS FOR ALLOCATING NETWORK RATES

RELATED APPLICATIONS

This application claims priority under 35 U.S.C. §119 to European Patent Application No. 10174500.8 filed on Aug. 30, 2010, the entire content of which is hereby incorporated by reference.

BACKGROUND OF THE INVENTION

1. Field of the Invention

The present relates to a method and an apparatus for allocating network rates. In particular, it relates to a scenario like a network resource allocation optimization problem, in which the operator would like to take into account the service quality perceived by the user.

2. Description of the Related Art

Network resource management and resource allocation in wireless network has become a priority for the mobile network operator due to a continuous increasing demand of video applications. In order to use the network resource efficiently and to achieve user satisfaction, the network needs to understand the application requirements, e.g., through deep packet inspection in the network. This enables the network to know the sensitivity of the video content and the packet dependency. The video sensitivity is the relationship of the video quality perceived by the user in dependence of network parameters such as for example the data rate and the packet loss rate. For instance, a video that contains a dynamic scene (e.g. sport) requires a higher data rate, and it is more sensitive to the packet loss. The packet dependency tells the network about the importance of the packet, and therefore, allowing the network to prioritize different packets. For instance, for a video codec using a group of pictures according to an I-B-P-B-P-B-... order, transmitting a packet containing an I-frame has a higher priority than packets of P-frame or B-frame, since the P-frame and B-frame could not be correctly decoded if the I-frame, on which it is dependent, is not being sent to the receiver successfully.

Allocating the network resources to multiple video streams containing different video contents is a challenging task for the network operator, since the network operator has to know how much network resources should be given to which video streams in order to efficiently use its limited network resource while keeping all users being served in the network satisfied.

Optimizing the network resource allocation with a consideration of different layers' abstracted information (e.g. application model/application sensitivity, channel quality condition) has been first introduced for elastic applications (e.g. file transfer application) (see e.g. F. P. Kelly, "Charging and rate control for elastic traffic," European Transaction of Telecommunication, vol. 8, pp. 33-37, January 1997). Later, in "S. Khan, S. Duhovnikov, E. Steinbach, and W. Kellerer, "MOS-based multiuser multiapplication cross-layer optimization for mobile multimedia communication," Advances in Multimedia, 2007, article ID 94918", the resource allocation is optimized across different applications by using the Mean Opinion Score (MOS), which is a quality measure which was originally proposed for voice application, as a common metric for user perceived quality measure (see e.g. ITU-T Recommendation P.800, "Method for subjective determination of transmission quality," August 1996). The optimal resource allocation is dependent on the objective function set by the network operator. There are several ways of setting an objective function for the network resource optimization problem such as a maximum of the average quality of all users (called MaxSum), or having a similar quality for all users regardless of application type and channel quality condition (called MaxMin). In addition, the network operator may also set a minimum guarantee quality for all users, and then adapts the resource allocation so as to achieve the same quality that is equal or higher than the guarantee quality (MaxMin-MinMOS), or so as to achieve maximum average quality (MaxSum-MinMOS).

Prior art addressing the problem of how the network resources are allocated to the user only are related to cross-layer optimization, in which the network resources allocation is optimized based on the information abstracted from different layers. In S. Khan, S. Duhovnikov, E. Steinbach, and W. Kellerer, "MOS-based multiuser multiapplication cross-layer optimization for mobile multimedia communication," Advances in Multimedia, 2007, article ID 94918, or in L.-U. Choi, M. T. Ivrlac, E. Steinbach, and J. A. Nossek, "Bottom-up approach to cross-layer design for video transmission over wireless channels," in Proc. IEEE Vehicular Technology Conference 2005-Spring (VTC'S05), vol. 5, Stockholm, Sweden, May 30-Jun. 1, 2005, pp. 3019-3025, or in U.S. Pat. No. 7,609,652B2—Apparatus and Method for Controlling an Operation of a Plurality of Communication Layers, they take the information from application, network, MAC and physical layer into account. Based on the objective function set for the optimization problem, the network resources are allocated differently. For example, a network may want to achieve a maximum of the average user perceived quality of all users like in Khan et al. Another approach could be to allocate the network resources such that all users perceive a similar quality of service, like in B. Radunovic and J.-Y. Le Boudec, "A unified framework for max-min and min-max fairness with applications," IEEE/ACM Trans. on Networking, vol. 15, no. 5, pp. 1073-1083, October 2007, or in U.S. Pat. No. 5,675,576-Congestion control system and method for packet switched networks providing max-min fairness. However, despite there are many different approaches to optimize resource allocation, none of the known approaches can deal efficiently with the problem how to avoid noticeable quality fluctuations.

It is therefore desirable to provide an approach which can effectively deal with this problem.

SUMMARY OF THE INVENTION

According to one embodiment there is provided a method for allocating network data rates to a plurality of mobile terminals through which users access possibly different applications through a network having a certain limited total bandwidth to allocate, said method comprising:

using as an input to an optimizing operation a quality utility function, which indicates for a certain application the quality perceived by a user depending on the allocated data rate, preferably further also depending on the channel condition, performing said optimizing operation such that it calculates a combined quality measure based on the quality utility functions for the different applications and for different possible resource allocations to the plurality of applications in such a way that said quality measure is optimized by finding among the plurality of possible resource allocations the resource allocation for which said quality measure reaches an extremum, to thereby obtain an overall optimized resource allocation for the network, wherein said method further comprises:

applying said optimizing operation such that it uses a penalty parameter in such a way that it penalizes a resource allocation for which the amount of deterioration of the user perceived quality compared to the user perceived quality in the past at one or more of said mobile terminals would exceed a certain threshold compared to another resource allocation for which the user perceived quality compared to the user perceived quality in the past does not exceed said certain threshold.

Introducing a penalty parameter makes it possible to consider temporal quality change and to perform the optimization of the resource allocation in such a way that the quality change at a certain user terminal does not exceed an amount which can be perceived by a user while optimizing the resource allocation under this given boundary condition.

According to one embodiment said certain threshold is set in advance as an amount of change of perceived quality which is not noticeable for a user or which is tolerable for a user. This makes it possible to set the limit of allowed fluctuations to an extent, which is not noticeable or tolerable by a user.

According to one embodiment said combined quality measure is based on:

adding for a certain application and for a certain allocated data rate the corresponding user perceived quality level of said application resulting from the allocated rate and the corresponding penalty parameter resulting from the change of quality, to thereby obtain for said certain application a penalized quality indicator;

obtaining a combined quality measure by adding up the penalized quality indicators obtained for said plurality of applications;

calculating said combined quality measure for a plurality of different possible resource allocations to said plurality of applications, and obtaining the one of said plurality of resource allocations for which said combined quality measure reached an extremum as the optimized resource allocation.

This offers a way to use a known optimization approach based on summing up and optimizing quality levels while still ensuring a maximum temporal quality change.

According to one embodiment said penalty parameter is calculated based on the difference between the amount of quality change compared to the past and said certain threshold.

This ensures that the temporal quality change and the desired threshold are both properly taken into account.

According to one embodiment to said penalty parameter a weighting factor is applied which gives more weight to said penalty parameter if the amount of quality change compared to the past exceeds said certain threshold.

This allows weighing the temporal quality change according to their desired impact on the overall quality measure.

According to one embodiment said penalty parameter or said weighting factor is zero if the amount of quality change compared to the past does not exceed said certain threshold, and said penalty parameter or said weighting factor is larger than zero, preferably larger than one, if the amount of quality change compared to the past does exceed said certain threshold.

This ensures that there will be no penalty if the threshold is not exceeded.

According to one embodiment said user perceived quality in the past is one of the following:

the user perceived quality at a moment of time, which precedes the current resource allocation by a certain amount of time;

the user perceived quality, which resulted from the preceding resource allocation;

the user perceived quality averaged over a certain period of time or a certain number of resource allocation steps in the past.

This gives examples of usable past user quality definitions.

According to one embodiment said weighting factor is one if the amount of quality change compared to the past does exceed said certain threshold; or said weighting factor is greater than zero and is linearly growing with the amount of quality change compared to the past if the amount of quality change compared to the past does exceed said certain threshold.

This gives examples how the penalty factor may be weighted as desired when influencing the optimization function.

According to one embodiment the method further comprises:

performing said resource allocation method repeatedly, preferably at a certain frequency;

tracking the user perceived quality levels of previously preformed resource allocations;

determining said user perceived quality of the past based on said tracked user perceived quality levels by averaging the user perceived quality levels which have been tracked over a certain amount of time or which have been resulting from a certain number of resource allocations.

This enables the implementing of a continuous optimization process over time.

According to one embodiment said optimization function comprises:

a first summation element being based on the summation of the perceived quality levels for each user terminal based on the resource allocation to be given by said each user terminal;

a second summation element being based on the summation of the quality differences for each user terminal between the quality level perceived by the user in the past and the quality level to be perceived based on the given resource allocation, wherein the second summation element is modified by multiplying the quality difference for each user terminal with the priority weight of the temporal quality change, said priority weight of temporal quality change being applied only when the quality difference between the quality level perceived by the user in the past and the quality level to be perceived based on the given resource allocation is greater than the threshold of temporal quality change, searching for the optimum network resource allocation that results in the maximum of the first summation element subtracted by the modified second summation element.

This enables an optimization based on a known optimization process but further implementing the penalty parameter into the process.

According to one embodiment there is provided an apparatus for allocating network rates to a plurality of mobile terminals through which users access possibly different applications through a network having a certain limited total bandwidth to allocate, said apparatus comprising:

a module adapted to use as an input to an optimizing operation a quality utility function which indicates for a certain application the quality perceived by a user depending on the allocated data rate, preferably further also depending on the channel condition, wherein said apparatus is adapted to perform said optimizing operation such that it calculates a combined quality measure based on the quality utility functions for the different applications and for different possible resource allocations to the plurality of applications in such a way that said quality measure is optimized by finding among the plurality of possible resource allocations the resource allocation for which said quality measure reaches an extremum, to thereby obtain an overall optimized resource allocation for the network, wherein said apparatus further comprises:

a module adapted to apply said optimizing function such that it uses a penalty parameter in such a way that it penalizes a resource allocation for which the amount of deterioration of the user perceived quality compared to the user perceived quality in the past at one or more of said mobile terminals would exceed a certain threshold compared to another resource allocation for which the user perceived quality compared to the user perceived quality in the past does not exceed said certain threshold.

In this manner an apparatus for implementing an embodiment of the invention may be implemented.

According to one embodiment the apparatus further comprises:

a module for implementing a method according to one of the embodiments of the invention.

According to one embodiment there is provided a computer program comprising computer executable code which when being executed on a computer-enables said computer to carry out a method according to one of the embodiments of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Before describing embodiments of the invention, first of all the meaning of some terms used in the following description will be clarified.
AS—Application Server
BS—Base station
CLO—Cross Layer Optimizer
MAC—Medium Access Control
MOS—Mean Opinion Score
PSNR—Peak Signal to Noise Ratio
QoE—Quality of Experience
UE—User Equipment According to one embodiment there is provided a method that makes use of the application utility function (or quality utility function), possibly also of the user's channel quality, and further of the total available network resources as an input to the optimization problem of resource allocation. The output of the proposed method is an optimal resource allocation (e.g. an data rate or symbol rate assigned to each user or to the application of its mobile device) to each user (or to each stream or to each user equipment, i.e. an allocation to each entity which is considered in the allocation process). The resource is allocated such that all active users (or entities), accessing various video contents and being present in the same wireless cell, are experiencing a smooth change of temporal video quality even in presence of a drastic change of wireless channel condition. At the same time, preferably the system efficiency in terms of network resource utilization is maintained as high as possible.

While there may have been prior approaches for modeling the expected user perceived quality, these works used MOS as a measure of expected user perceived quality. The purpose of application modeling in the prior art was to know how the user perceived quality changes with respect to the network/application performance metric (e.g. data rate, packet loss, PSNR) and not with respect to a certain threshold exceeding of those values. According to an embodiment of the present invention, however, such a threshold of "maximum allowed user perceived quality fluctuation compared to the past" is introduced and used for determining the resource allocation in such a way that the quality fluctuation perceived by a user is limited and the limit is taken into account when performing the resource allocation.

None of the previously known mentioned objective functions was taking the change of temporal quality perceived by the user into account. For example, with the MaxSum objective function, when the channel quality condition is changing over time drastically, the user will experience a drastic change of video quality and may be annoyed while watching the video. This is because when the channel quality condition is getting poor, the optimizer will not give any network resources to the user. But when the channel quality is very good, the optimizer will give a higher priority for network resource allocation to this user, and hence the service quality perceived by this user would be good or even very good. In contrary, with the MaxMin objective function, all users will perceive the same quality, which would make the temporal quality smooth. However, this leads to a minimum of system efficiency, as most of the network resources will be given to the user having a poor channel quality or to the user accessing a high-demand application.

According to embodiments of the invention there is now considered an impact of temporal quality perceived by the user to the objective function of the network resource allocation problem, hence there is improved the overall user perceived quality of the whole period of accessing the service/application.

According to one embodiment the present invention is making use of the fact that the human being is only capable to recognize a temporal fluctuation in quality, which exceeds a certain threshold. This is somewhat similar to any other instances, in which a human being is able to perceive the change a value of an object, for example the perception of weight change of instance carried object, which is only perceivable if the weight change exceeds a certain threshold. In a similar way there is also a certain threshold of temporal video quality change that human eyes are able to recognize. According to one embodiment there is now considered such a threshold in the objective function, which is used for solving the network resource allocation problem. This gives the optimizer more flexibility for network resource allocation. For instance, within the range of unperceivable video quality change, some of the network resources allocated to the user accessing a low-demanding video or to the user having a good channel condition may be given to the user accessing a high-demanding video or to the user having a bad channel condition, while the user giving the resources to others does not perceive much of a quality degradation or no quality degradation. In other words, the parameter of a "perceived quality degradation threshold" allows the network entity which is responsible for the resource allocation to "reduce" the quality of a video stream to such an extent that the user will not (or almost not) notice it, and the network resources which are "freed" by this intentional quality degradation can then be used for other applications or video streams or users which need them more urgently to avoid that their quality decreases beyond the threshold, for example because they are using a video stream which is more demanding in terms of resources if a certain quality level should be maintained, as is e.g. the case for a sports video According to one embodiment the change of temporal video quality and its human perceivable threshold are considered as factors or parameters which affect the overall user-perceived quality rating (which is determined by an "objective function" which is responsible for the calculation of the resource allocation) which is carried out when performing a QoE-based network resource allocation optimization.

By applying the methods according to embodiments of the invention, the network operator becomes capable to;

Optimize the usage of the limited network resources by taking the change of temporal video quality into account;

Prevent any drastically changes of temporal video quality due to a dynamic change of wireless channel condition;

Keep a user satisfaction as high as possible by providing a video delivery service with a smooth change of video quality.

In the following, embodiments of the invention will be described in somewhat more detail.

Figure 1:
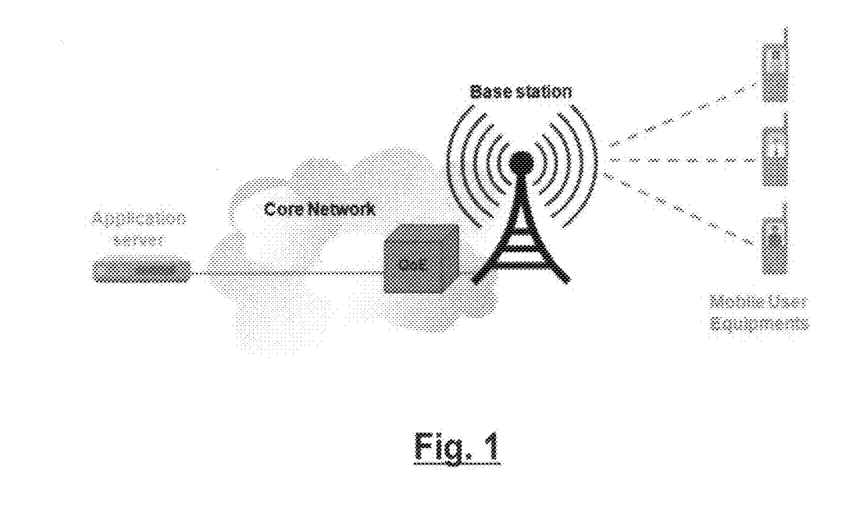
FIG. 1 schematically illustrates a scenario to which embodiments of the present invention may be applied.

FIG. 1 shows the general scenario to which embodiments of the present invention apply. The considered network architecture consists of four main network elements: Application Server (AS), QoE-based optimizer (QoE module), Base Station (BS), and the User Equipment (UE). The AS is the source of the application data stream that the user would like to access. The QoE module is acting as a downlink resource allocator that performs a network resource allocation optimization.

The resource allocation is performed by an optimizing function or a so-called "objective function" based on a set of input parameters to the "objective function". These input parameters may e.g. include a long-term link layer (e.g. channel condition of each UE). The input parameters include an application utility information or application/quality utility function, which indicates e.g. the user-perceived quality with respect to changes in application data rate. The quality utility function or application utility function therefore indicates for a certain application the quality perceived by a user depending on an allocated data rate. The application/quality utility function may be specific for a certain application (e.g. for a video stream, it may even be specific for a certain video stream), it may e.g. have been determined in advance and may e.g. be sent together with the application data from the application server to the QoE module. Alternatively the quality utility function may be stored in the QoE module and the data from the application server may just contain an identifier so that the QoE module is capable to identify for the data (e.g. the video stream) the corresponding quality utility function to be applied during the optimization process.

Another input parameter to the optimizing function (or the "objective function") is the quality threshold such as a perceivable change of temporal quality (threshold of temporal quality change perceivable by the user). The network operator may have previously set this threshold, or dynamically set this threshold during the system run-time.

The BS is the node that schedules the packets to the UEs. The UE is the destination of the (adapted) application data stream that would be experienced by the end user, and the packets are delivered to the different UEs using the resources allocated to the UEs by the QoE module based on the optimization function.

In other words, there is a network (formed by the BS and the UEs) where several mobile terminals (the UEs) can access different applications through a network having a limited bandwidth (the BS has not an unlimited capability), and the UEs receive their data using network resources which have been assigned to them using an optimization function which takes into account a quality utility information and a threshold of temporal quality change.

Using the quality utility function the QoE module may—based on the available resources (e.g. the total bandwidth of the BS) calculate a combined quality measure for different possible resource allocations to the different UEs. One of the simplest ways of doing this would e.g. be to calculate—for a certain resource allocation where each UE has been assigned a certain data rate—the sum of the MOS for the different UEs. This combined measure can be obtained by using the quality utility function which gives the perceived quality (e.g. the MOS) for a given data rate. In this way the combined quality measure can be obtained for a certain resource allocation, and then it can be obtained in the same way for plurality of different possible resource allocations (e.g. the QoE may just calculate the combined measure for different resource allocations to the different UEs, preferably for all possible different resource allocations).

In such a way there could be obtained an optimum resource allocation as the one where the combined quality measure (e.g. the sum of the MOS of the different UEs) reaches an extremum (e.g. a maximum).

According to one embodiment, however, there is now used a penalty parameter which is introduced into the calculation of the combined quality measure. For that purpose, for a certain resource allocation (e.g. for a certain data rate assigned to a certain UE) it is determined whether the resulting quality measure (as determined based on the quality utility function) deviates from the perceived quality of this UE in the past (e.g. at the time of the previous allocation or at a certain time period before) to an extent which exceeds a certain threshold (a "temporal quality change threshold"). If this is the case, then a penalty parameter is used in the optimizing function to penalize this resource allocation for which it has been determined that the resulting perceived quality for the UE would change to an extent, which exceeds the threshold. The penalty parameter may e.g. be introduced as a negative term, which is added to the perceived quality as determined by the quality utility function. This means that the "perceived quality" for this resource allocation and for this UE is negatively "weighted" or "negatively affected" by the penalty parameter, and as a consequence the combined quality measurement for this resource allocation will also be negatively affected because the individual quality contribution of the UE for which the quality change exceeds the threshold is contributing to the combined quality measurement in a way which is negatively affected by the penalty parameter.

In other words, if for a certain resource allocation (i.e. for a certain allocation pattern where for the n-th UE there is assigned a data rate Rn) the quality fluctuation at one of the UEs would exceed a certain tolerable threshold, then the combined quality measurement which corresponds to this resource allocation and which is determined by the optimizing function will be negatively affected (=be indicative of a lower overall quality) due to the penalty parameter which is then becoming effective in the optimizing function.

According to one embodiment the combined quality measurement is calculated based on the individual quality measurements of the different UEs as derived from the quality utility function for a certain resource allocation, and if there is a quality change which exceeds the temporal quality change threshold a one of the certain UEs, then the penalty parameter will be applied to the individual quality measure for this UE where the change exceeds the threshold. If more than one UEs would exceed the quality change threshold for a certain resource allocation, then for each of them their individual quality measure would be affected by the penalty parameter.

Since the combined quality measurement according to one embodiment is based on a combination of the individual quality measures for the different UEs as determined by the quality utility function, the combined quality measure will be rather heavily penalized in case of a resource allocation for which many UEs would experience a quality deterioration which would exceed the quality change threshold.

The network operator may set the threshold in advance, and it may be chosen such that it corresponds to a quality change, which is (just) not yet noticeable by or tolerable for an average human being.

In the following there will be described further embodiments how the optimizer (the QoE module) allocates the wireless network resources differently depending on the objective function (the optimizing function) set prior to optimization. There will be explained in somewhat more detail the conventional objective function (optimizing function) that maximizes a summation of MOS of all users, and the new objective function according to embodiments of the invention, which take the change of temporal quality into account.

First there will be explained an approach which is based on the Maximization of overall quality (MaxSumMOS).

In approaches known from the literature, the objective function that is often used for the network resource allocation optimization is the proportional fairness objective function (see e.g. Khan et al. above), which enforces the optimizer to allocate the network resources first to the user having good channel condition and accessing an application that gives high user perceived quality with a small bandwidth. In other words, it finds an optimal resource allocation that maximizes the sum of the perceived service quality of all users (called 'MaxSumMOS'). Mathematically, the MaxSumMOS objective function (or optimizing function) can be formulated as follows:

$$\tilde{x}_{opt} = \underset{\tilde{x} \in \tilde{X}}{\operatorname{argmax}} \sum_{i=1}^{K} MOS_i(\tilde{x}) \quad (1)$$

subject to $$\sum_{i=1}^{K} \alpha_i \leq 1, \alpha_i \geq 0 \quad (2)$$

where $\tilde{x}$ is the abstracted parameter tuple $\tilde{x} \in \tilde{X}$. $\tilde{X}$ is the set of possible parameter tuples abstracted from the protocol layers representing the set of candidate operation modes. $\alpha$ is the fraction of network resource to be allocated to the user—i. K is the total number of users that are currently active and served by the same base station.

In the following there will now be described in more detail an approach according to one embodiment which is based on the Minimization temporal quality change (MinTempChange).

To avoid annoyance of watching a video due to a fluctuation of temporal video quality, the network operator may design an objective function, such that it enforces that the temporal video quality varies within the range of the threshold of temporal quality change ($\Delta MOS_{th}$). With this requirement being fulfilled, the user will not be able to perceive the change of temporal video quality. In addition to the consideration of $\Delta MOS_{th}$, the network operator may want to make sure that the network resource is used efficiently. This can be achieved, for example, by using the MaxSumMOS objective function, which maximizes the network resource utilization in terms of average user perceived quality of all users. Nevertheless, as mentioned earlier, the MaxSumMOS objective function alone does not care of the fluctuation of temporal video quality. In order to take both requirements into account, the MaxSumMOS objective function may according to one embodiment be modified as follows:

$$\tilde{x}_{opt} = \underset{\tilde{x} \in \tilde{X}}{\operatorname{argmax}} \left[ \left( \sum_{i=1}^{K} MOS_i(\tilde{x}) \right) - \left( \beta \sum_{i=1}^{K} (\Delta MOS_i - \Delta MOS_{th}) \right) \right] \quad (3)$$

$$\Delta MOS_i = |(MOS_i(t-1) - MOS_i(\tilde{x}))| \quad (4)$$

subject to $$\sum_{i=1}^{K} \alpha_i \leq 1, \alpha_i \geq 0 \quad (5)$$

where t is the notion of time scale, and MOS(t−1) as an example of the user perceived quality of the past is the average MOS value from the last 1 second. It could also be the MOS or the last resource allocation, or the MOS at a certain time period before the instantaneous time. The subtracted element in equation (3) may be regarded as a "penalty parameter" which—if the perceived quality exceeds the threshold—negatively affects the overall perceived quality. β is a weight factor that—together with the factor which follows—penalizes the conventional MaxSumMOS objective function (see (1)) for a certain resource allocation, which would results in a perceivable change of temporal video quality. β can be formulated as follows:

$$\beta = \begin{cases} 0 & \text{if } \Delta MOS_i < \Delta MOS_{th} \\ 1 & \text{if } \Delta MOS_i \geq \Delta MOS_{th} \end{cases} \quad (6)$$

With the β defined in (6), one could consider it as a linear penalty factor to the conventional MaxSumMOS objective function. The penalty parameter consists in this embodiment in the factor β (penalty weighting factor) and its following factor as defined in (5).

Alternatively, if an operator wants to increase an impact of the penalty factor (weighting factor) meaning that the optimizer should concentrate more on the impact of fluctuation of temporal video quality, for example with a quadratic function, β could be formulated as follows:

$$\beta = \begin{cases} 0 & \text{if } \Delta MOS_i < \Delta MOS_{th} \\ (\sigma \cdot \Delta MOS_i) + \rho & \text{if } \Delta MOS_i \geq \Delta MOS_{th} \end{cases} \quad (7)$$

where σ and ρ are a constant parameter that may be set by the operator prior to network resource allocation optimization.

In summary, one may say that equation (3) means that the optimizer (QoE module) tries to find an optimal network resource allocation such that all users perceive the change of temporal video quality as minimal as possible (below a certain defined threshold), while keeping the efficiency of network resource usage as high as possible (i.e. maximizing the overall quality under the condition of the limited temporal quality change).

Figure 2:
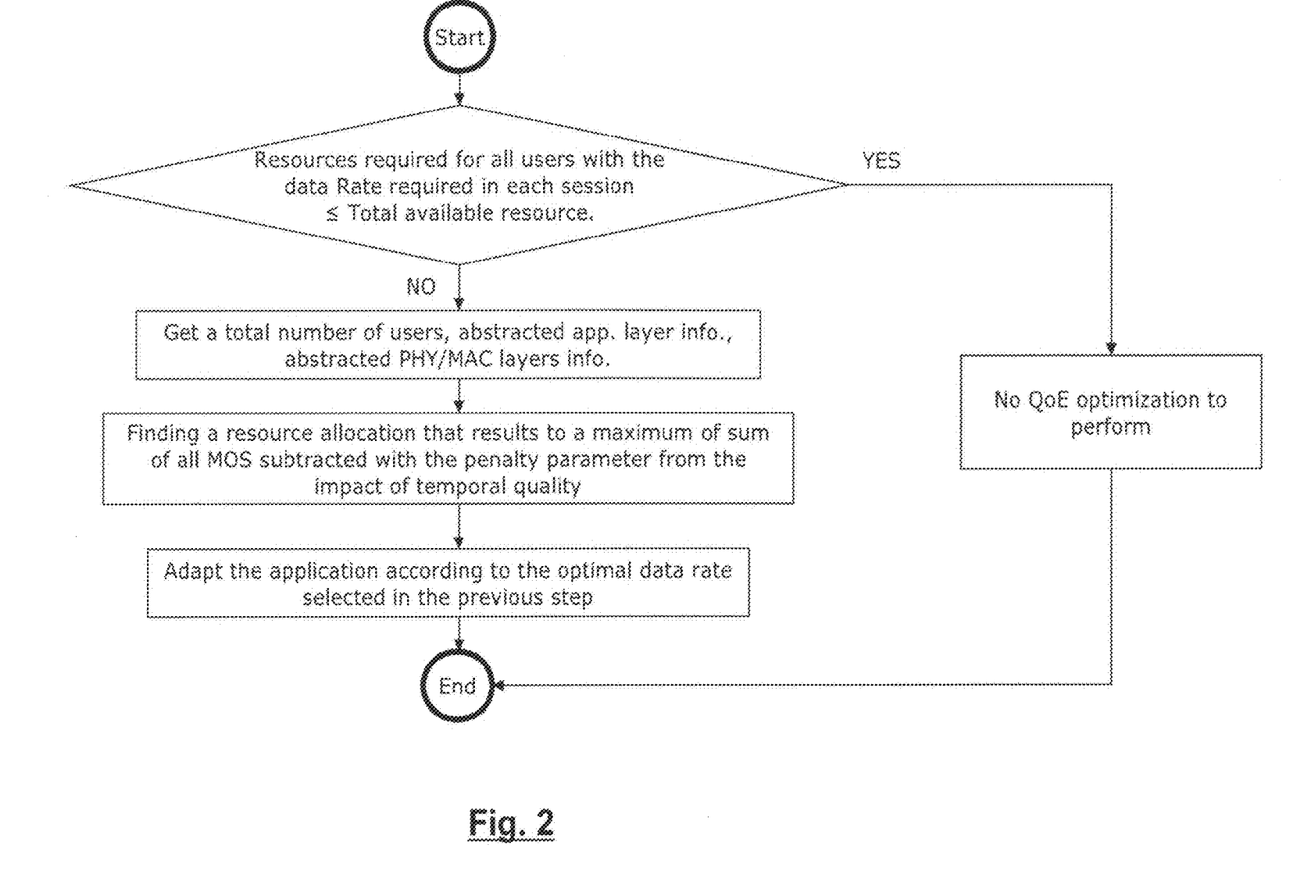
FIG. 2 shows a flowchart schematically illustrating an embodiment of the invention.

FIG. 2 shows a schematic illustrative overview of the algorithm for finding an optimal network resource allocation with the MinTempChange objective function.

One can see from FIG. 2 that first of all it is checked whether the available resources are sufficient to serve all sessions. If this is the case, then no rate adaptation is necessary at all, and the QoE module does not need to perform a resource allocation optimization because in such a case the optimum resource allocation is to just allocate to each session the data rate which it requests. Only if the available resources are not sufficient for all sessions (answer NO), then a resource allocation optimization becomes necessary.

Then, in a next step, there are obtained all necessary information to perform the optimization, such as the number of users (or terminals), the app. Layer info (i.e. the quality utility function), and possibly also the abstracted PHY/MAC layers information, which may be used to take into account also the channel condition into the optimization. In the embodiments so far it has only been mentioned that the quality measure is determined based on the quality utility function which has as an input the data rate, but there may further also be taken into account the channel condition, either as a separate parameter when calculating the quality measure, or as an input parameter of the quality utility function.

Then, based on the obtained information there is carried out an optimization to find the resource allocation which gives the maximum quality while at the same time ensuring that the temporal quality change does not exceed a certain threshold by taking into account a penalty parameter. The optimized resource allocation is then used to distribute the data to the user terminals. For that purpose the UEs are served by a data rate which may be lower than the requested data rate of the applications running on the respective UEs (which may e.g. be video streams), and the data rate may be realized by modifying the requested data rate to the one determined by the optimization process by any rate shaping scheme.

Figure 3A:
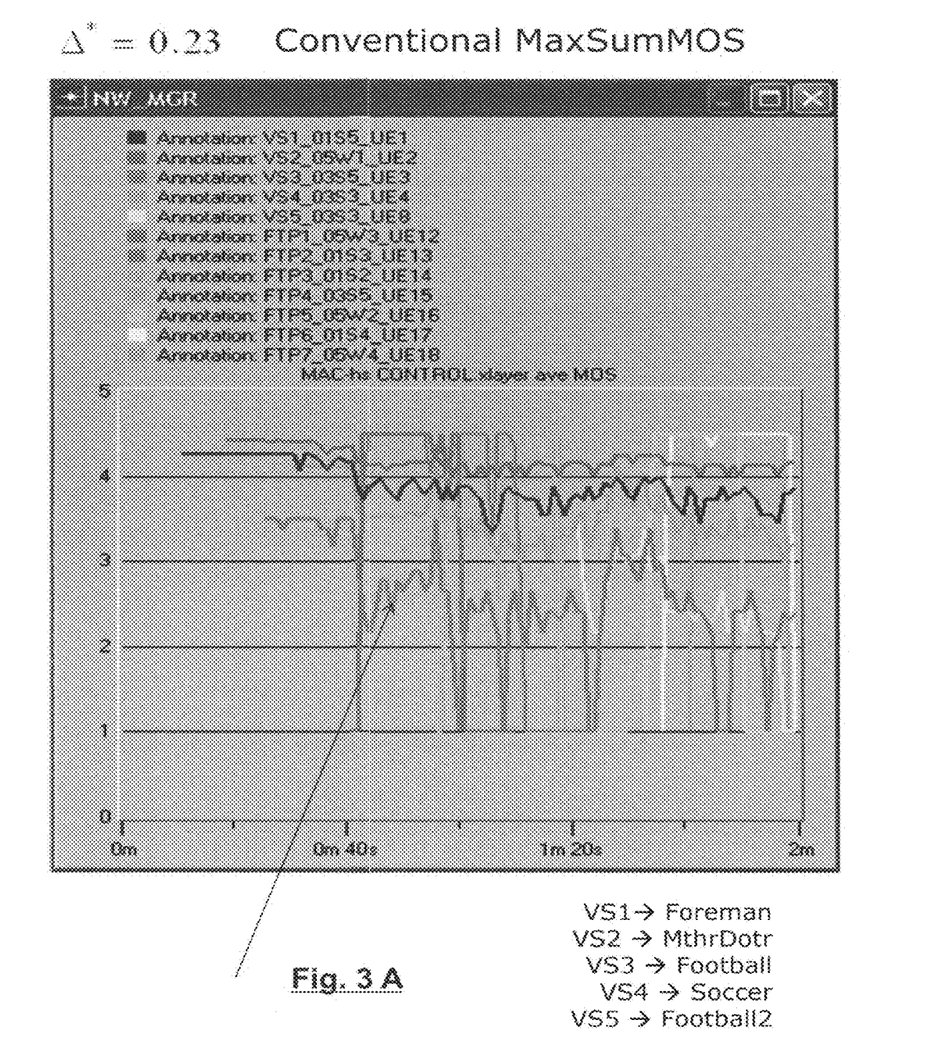
FIGS. 3A and 3B show a simulation result illustrating the effect of an embodiment of the invention.
Figure 3B:
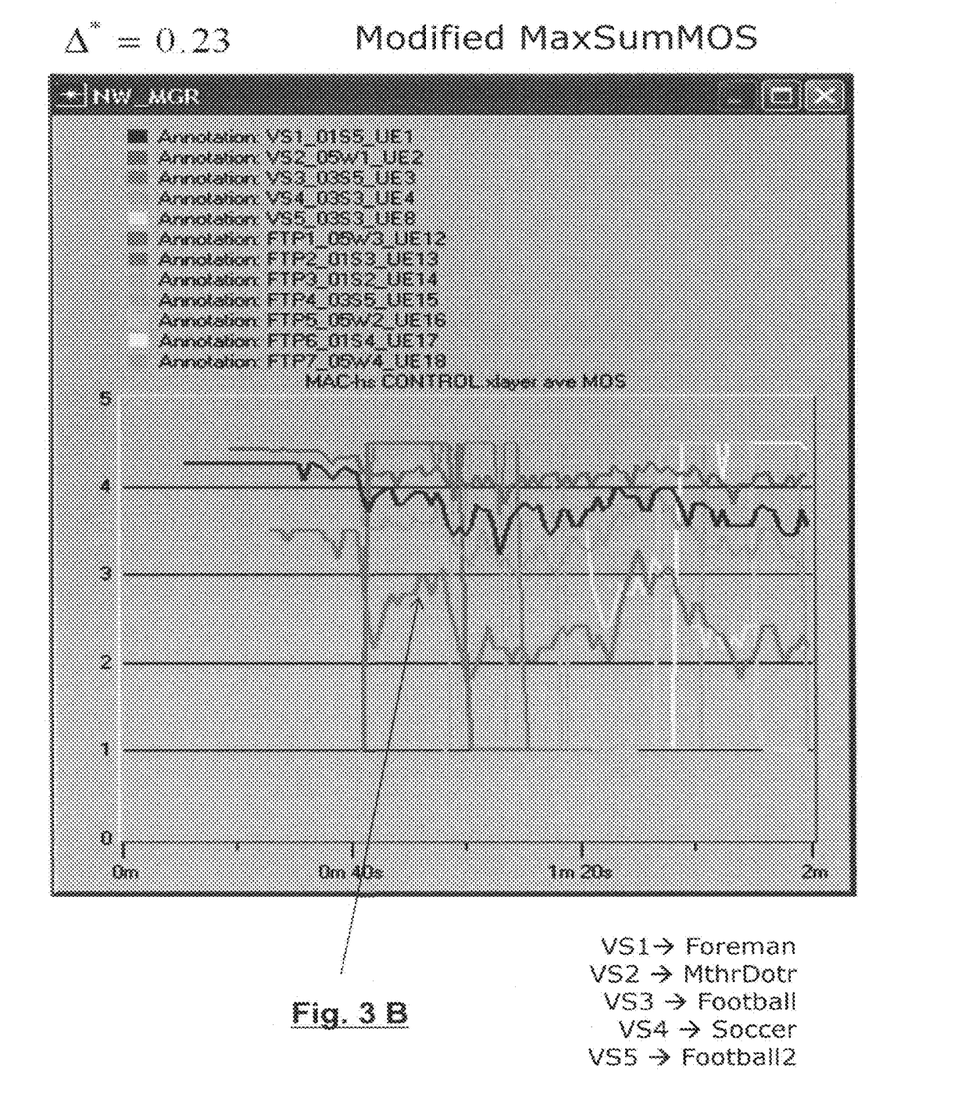

To facilitate a better understanding of an impact of the MinTempChange objective function, in FIGS. 3A and 3B there are plotted the statistics of user-perceived quality in time that were receive from a HSDPA simulation as shown in FIGS. 3A and 3B. Obviously, taking a look at the VS3 user (the line marked by an arrow), the user perceived much smoother quality when applying the MinTempChange objective function with $\Delta MOS_{th}$ 0.23.

It will be readily apparent to the skilled person that the methods, the elements, units and apparatuses described in connection with embodiments of the invention may be implemented in hardware, in software, or as a combination of both. In particular it will be appreciated that the embodiments of the invention and the elements of modules described in connection therewith may be implemented by a computer program or computer programs running on a computer or being executed by a microprocessor. Any apparatus implementing the invention may in particular take the form of a network entity such as a router, a server, a module acting in the network, or a mobile device such as a mobile phone, a smartphone, a PDA, or anything alike.

What is claimed is:

1. A method for allocating network data rates to a plurality of mobile terminals through which users access possibly different applications through a network having a certain limited total bandwidth to allocate, said method comprising:

using as an input to an optimizing operation a quality utility function which indicates for a certain application the quality perceived by a user depending on the allocated data rate, preferably further also depending on the channel condition, performing said optimizing operation such that it calculates a combined quality measure based on the quality utility functions for the different applications and for different possible resource allocations to the plurality of applications in such a way that said quality measure is optimized by finding among the plurality of possible resource allocations the resource allocation for which said quality measure reaches an extremum, to thereby obtain an overall optimized resource allocation for the network, wherein said combined quality measure is based on:

adding for a certain application and for a certain allocated data rate the corresponding user perceived quality level of said application resulting from the allocated rate and the corresponding penalty parameter resulting from the change of quality, to thereby obtain for said certain application a penalized quality indicator;

obtaining a combined quality measure by adding up the penalized quality indicators obtained for said plurality of applications;

calculating said combined quality measure for a plurality of different possible resource allocations to said plurality of applications, and obtaining the one of said plurality of resource allocations for which said combined quality measure reached an extremum as the optimized resource allocation, wherein said method further comprises:

applying said optimizing operation such that it uses a penalty parameter in such a way that it penalizes a resource allocation for which the amount of deviation of the user perceived quality from a user perceived quality in the past at one or more of said mobile terminals would exceed a certain threshold compared to another resource allocation for which the amount of deviation of the user perceived quality from the user perceived quality in the past does not exceed said certain threshold.

2. The method of claim 1, wherein said certain threshold is set in advance or dynamically set during system run-time as an amount of change of perceived quality which is not noticeable for a user or which is tolerable for a user.

3. The method of claim 1, wherein
said penalty parameter is calculated based on the difference between the amount of quality change compared to the past and said certain threshold.

4. The method of claim 3, wherein to said penalty parameter a weighting factor is applied which gives more weight to said penalty parameter if the amount of quality change compared to the past exceeds said certain threshold.

5. The method of claim 4, wherein
said penalty parameter or said weighting factor is zero if the amount of quality change compared to the past does not exceed said certain threshold, and said penalty parameter or said weighting factor is larger than zero, preferably larger than one, if the amount of quality change compared to the past does exceed said certain threshold.

6. The method of claim 1, wherein
said user perceived quality in the past is one of the following:
the user perceived quality at a moment of time, which precedes the current resource allocation by a certain amount of time;
the user perceived quality, which resulted from the preceding resource allocation;
the user perceived quality averaged over a certain period of time or a certain number of resource allocation steps in the past.

7. The method of claim 5, wherein
said weighting factor is one if the amount of quality change compared to the past does exceed said certain threshold; or
said weighting factor is greater than zero and is linearly growing with the amount of quality change compared to the past if the amount of quality change compared to the past does exceed said certain threshold.

8. The method of claim 1, further comprising:
performing said resource allocation method repeatedly, preferably at a certain frequency;
tracking the user perceived quality levels of previously preformed resource allocations;
determining said user perceived quality of the past based on said tracked user perceived quality levels by averaging the user perceived quality levels which have been tracked over a certain amount of time or which have been resulting from a certain number of resource allocations.

9. The method of claim 1, wherein said optimization function comprises:
a first summation element being based on the summation of the user perceived quality levels for each user terminal based on the resource allocation to be given by said each user terminal;
a second summation element being based on the summation of the quality differences for each user terminal between the quality level perceived by the user in the past and the quality level to be perceived based on the given resource allocation, wherein
the second summation element is modified by multiplying the quality difference for each user terminal with the priority weight of the temporal quality change, said priority weight of temporal quality change being applied only when the quality difference between the quality level perceived by the user in the past and the quality level to be perceived based on the given resource allocation is greater than the threshold of temporal quality change,
searching for the optimum network resource allocation that results in the maximum of the first summation element subtracted by the modified second summation element.

10. A data processing system including hardware and software cooperating to implement an apparatus for allocating network data rates to a plurality of mobile terminals through which users access possibly different applications through a network having a certain limited total bandwidth to allocate, said apparatus comprising:
a module adapted to use as an input to an optimizing operation a quality utility function which indicates for a certain application the quality perceived by a user depending on the allocated data rate, preferably further also depending on the channel condition, wherein
said apparatus is adapted to perform said optimizing operation such that it calculates a combined quality measure based on the quality utility functions for the different applications and for different possible resource allocations to the plurality of applications in such a way that said quality measure is optimized by finding among the plurality of possible resource allocations the resource allocation for which said quality measure reaches an extremum, to thereby obtain an overall optimized resource allocation for the network,
wherein said apparatus is adapted such that said combined quality measure is based on:
adding for a certain application and for a certain allocated data rate the corresponding perceived quality level of said application resulting from the allocated rate and the corresponding penalty parameter resulting from the change of quality, to thereby obtain for said certain application a penalized quality indicator;
obtaining a combined quality measure by adding up the penalized quality indicators obtained for said plurality of applications;
calculating said combined quality measure for a plurality of different possible resource allocations to said plurality of applications, and
obtaining the one of said plurality of resource allocations for which said combined quality measure reached an extremum as the optimized resource allocation,
wherein said apparatus further comprises:
a module adapted to apply said optimizing operation such that it uses a penalty parameter in such a way that it penalizes a resource allocation for which the amount of deviation of the user perceived quality from the user perceived quality in the past at one or more of said mobile terminals would exceed a certain threshold compared to another resource allocation for which the amount of deviation of the user perceived quality from the user perceived quality in the past does not exceed said certain threshold.

11. The data processing system of claim 10, wherein said certain threshold is set in advance as an amount of change of perceived quality which is not noticeable for a user or which is tolerable for a user.

12. A computer program product comprising a non-transitory computer-readable storage medium having computer executable code stored thereon which when being executed on a computer enables said computer to carry out a method for allocating network data rates to a plurality of mobile terminals through which users access possibly different applications through a network having a certain limited total bandwidth to allocate, said computer program product comprising:
computer program code for using as an input to an optimizing operation a quality utility function which indicates for a certain application the quality perceived by a user depending on the allocated data rate, preferably further also depending on the channel condition,
computer program code for performing said optimizing operation such that it calculates a combined quality measure based on the quality utility functions for the different applications and for different possible resource allocations to the plurality of applications in such a way that said quality measure is optimized by finding among the plurality of possible resource allocations the resource allocation for which said quality measure reaches an extremum, to thereby obtain an overall optimized resource allocation for the network, wherein said combined quality measure is based on:
adding for a certain application and for a certain allocated data rate the corresponding user perceived quality level of said application resulting from the allocated rate and the corresponding penalty parameter resulting from the change of quality, to thereby obtain for said certain application a penalized quality indicator;
obtaining a combined quality measure by adding up the penalized quality indicators obtained for said plurality of applications;
calculating said combined quality measure for a plurality of different possible resource allocations to said plurality of applications, and
obtaining the one of said plurality of resource allocations for which said combined quality measure reached an extremum as the optimized resource allocation,
wherein said computer program product further comprises:
computer program code for applying said optimizing operation such that it uses a penalty parameter in such a way that it penalizes a resource allocation for which the amount of deviation of the user perceived quality from a user perceived quality in the past at one or more of said mobile terminals would exceed a certain threshold compared to another resource allocation for which the amount of deviation of the user perceived quality from the user perceived quality in the past does not exceed said certain threshold.

* * * * *